United States Patent

Spurr et al.

[11] 4,067,438
[45] Jan. 10, 1978

[54] MAGNETIC DRIVE FOR CONVEYOR

[75] Inventors: Robert Spurr, West Hartford; Francis A. Dahms, Tariffville; Francis A. Sarkozy, West Hartford, all of Conn.

[73] Assignee: Emhart Industries, Inc., Farmington, Conn.

[21] Appl. No.: 394,217

[22] Filed: Sept. 4, 1973

[51] Int. Cl.² .............................................. B65G 23/18
[52] U.S. Cl. ...................................... 198/805; 74/210; 198/834
[58] Field of Search ................. 198/41, 203, DIG. 13, 198/805, 834, 690; 308/10, 156; 74/210, 229

[56] References Cited

U.S. PATENT DOCUMENTS

| 1,497,619 | 6/1924 | Waechter et al. | 198/203 |
| 2,413,339 | 12/1946 | Stadelman | 198/203 |
| 2,642,174 | 6/1953 | Buccicone | 198/41 |
| 2,759,606 | 8/1956 | Nippert | 198/41 |
| 2,847,111 | 8/1958 | Buccicone | 198/41 |
| 2,876,878 | 3/1959 | Sinclair et al. | 74/210 |
| 3,179,241 | 4/1965 | Kain | 198/193 |
| 3,208,296 | 9/1965 | Baermann | 74/210 |
| 3,273,001 | 9/1966 | Baermann | 310/156 |
| 3,437,074 | 4/1969 | Hagopian et al. | 198/41 |
| 3,497,056 | 2/1970 | Clark | 198/203 |
| 3,610,583 | 10/1971 | Ostrom | 198/41 |

FOREIGN PATENT DOCUMENTS

| 654,147 | 1/1965 | Belgium | 198/41 |
| 1,159,347 | 12/1963 | Germany | 198/41 |

Primary Examiner—John J. Love
Assistant Examiner—Richard K. Thomson
Attorney, Agent, or Firm—McCormick, Paulding & Huber

[57] ABSTRACT

A magnetic drive for a metallic conveyor belt is provided by a driving wheel having permanent magnets disposed in the outer periphery thereof, the magnets protruding radially outwardly so that they act as cleats for driving the belt in addition to supplying a magnetic shear force for driving the belt.

10 Claims, 6 Drawing Figures

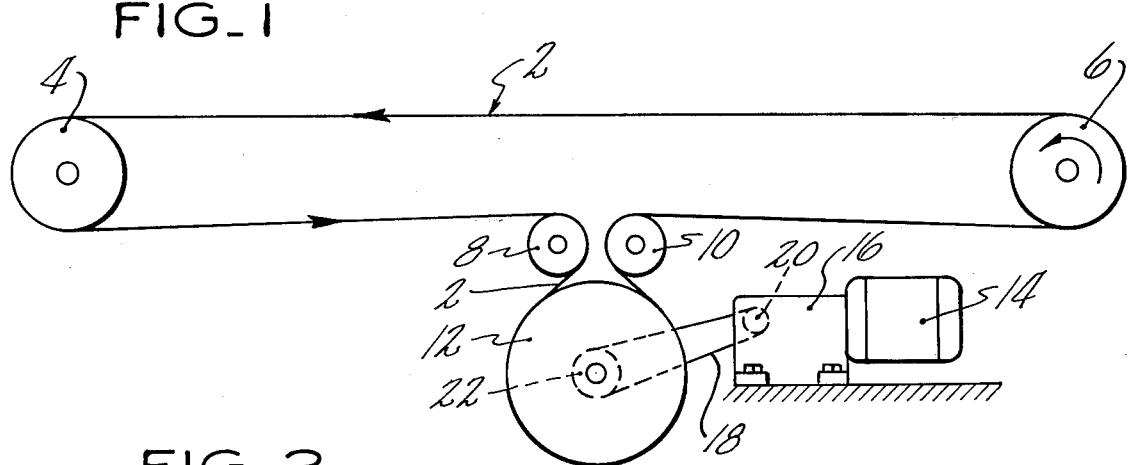
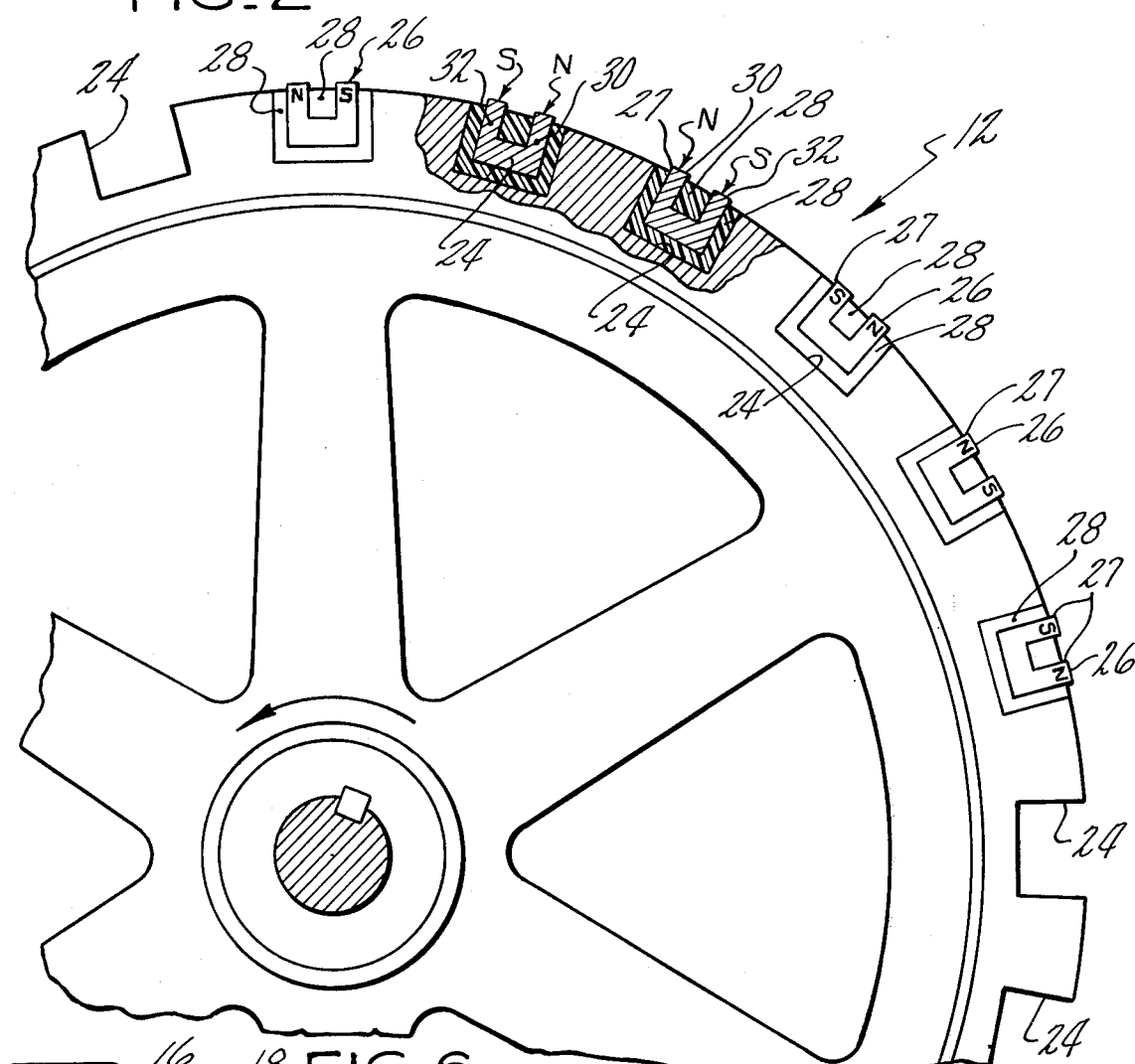
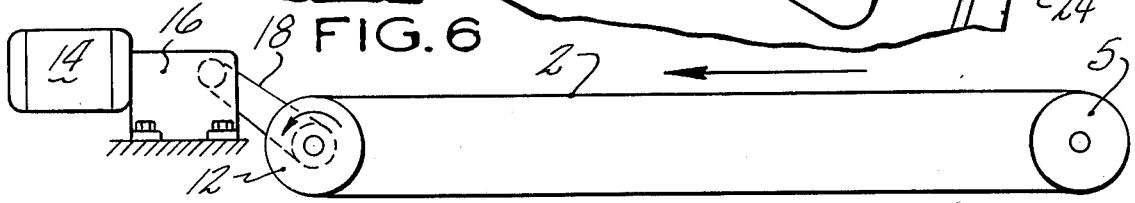

MAGNETIC DRIVE FOR CONVEYOR

BACKGROUND OF THE INVENTION

1. Field of the Invention

This invention relates to conveyor drives and particularly to magnetic drives for endless, woven magnetically attractable conveyor belts and the like in high traction force systems.

2. Description of the Prior Art

In glassware manufacturing it is known to utilize an endless, woven, metallic conveyor belt of, for example, ferrous metal wire mesh construction for transferring glassware between a forming machine and an annealing lehr, for example. There are also inumerable other industries and manufacturers where articles are transferred from one location to another by endless, woven metallic wire mesh conveyor belts. Further, there are many different techniques and machines for driving the conveyor belts including pulley drives, tractor drives and magnetic drives. The problems encountered with known metallic wire mesh conveyor belt drives are numerous: for example, after use for a period of time, the belt tends to stretch; this causes the belt to slip as it is being driven. Slippage of the belt is undesirable because it is an inefficiency in the conveyor system; it is also very undesirable where the conveyor is utilized to transfer articles in some sort of timed relationship with other processes being performed on the articles because it causes the articles to get out of spatial relation. For example, in glassware manufacture, it is desirable to transport hot newly formed glassware from the forming machine to an annealing lehr; it is essential that the belt be driven at a constant critical speed to provide for known equal spacing of the glassware placed thereon as the conveyor belt passes the multiple sections of the composite glassware forming machine. If the belt slips, the articles are no longer equally spaced.

Pulley drives depend entirely on friction between the belt and the pulley wheel. As the belt wears it stretches requiring constant adjustment of belt tension. Lagged pulleys, pulley wheels having a friction increasing material applied thereto, show some improvement over the plain pulley, but not a significant improvement. Tractor drives, such as the drive shown and described in U.S. Pat. No. 3,249,209, utilize friction and compression of the belt to pull it. The tractor drive is a complex machine and costly because of the complexity; further, it is somewhat prone to failure because of the complexity and great number of parts which form it. The magnetic tractor drive shown in U.S. Pat. No. 3,497,056 relies completely on the shear force of the magnets to drive the conveyor belt. There is no utilization of friction forces or wrap forces to drive the belt. Other magnetic drives known in the art, such as drive wheels having magnets therein, also rely only upon magnetic shear force to drive the belt. Further, known magnetic drive wheels have the poles of the magnet disposed substantially parallel to the direction traversed by the belt; this causes poor holding of the belt by the magnetic wheel at the belt edges since the magnet's force is applied mostly to the center of the belt, with very little force holding the edge of the belt.

Our invention overcomes these and other deficiencies in conveyor belt drives.

SUMMARY OF THE INVENTION

The object of the present invention is to provide a positive, nonslipping drive mechanism for a metallic wire mesh conveyor belt, or the like, which operates efficiently regardless of belt wear, belt loading, belt length, etc., or lubricants on the belt, and which is relatively inexpensive when compared to other belt drives known in the art.

It is a further object of the present invention to provide a magnetic drive mechanism for a metallic wire mesh conveyor belt, or the like, which produces a belt pulling force on the order of about 2.5 times (or more) the shear force of the magnets along. This depends to some extent on the number and size of the magnets, the wheel configuration (i.e. magnets protruding slightly to act as cleats) and the degree to which the belt is wrapped around the magnetic drive wheel.

In accordance with the present invention the above objects and others are provided by the combination of a drive wheel for driving an endless metallic conveyor belt having slots disposed in the outer periphery of the wheel, a permanent magnet disposed in each of the slots, and means for securing the magnets in the slots to the wheel, which securing means is advantageously bonding means which also serves as insulation to magnetically isolate the magnets from the wheel. The wheel may be, for example, cast iron. Bonding the magnets in place has significant advantages over the usual method of bolting them to a wheel: magnets are contemplated to be made of a material, such as alnico, which is a very hard, but brittle, material. Often if too much force is applied to a bolt attaching a magnet of alnico to a wheel or whatever, the magnet will crack, necessitating the removal of the cracked magnet and replacement with a new magnet. If the magnet is bonded in place, the likelihood of cracking it is lessened in the first place. Secondly, if the magnet should for some reason crack after it has been bonded in place in the wheel slot, the magnet will still be firmly held and need not be replaced.

In accord with a further aspect of the invention, the magnets are bonded in the slots in the wheel so that the edges of the magnets protrude slightly radially outwardly of the wheel itself. This allows the magnets to act as driving cleats because they will bite into the belt, thereby increasing the friction between the belt and the driving wheel the thus increasing the driving force applied to the belt by the driving wheel. This is very important to an improved magnetic drive because the shear force supplied by the magnets is not sufficient for a high traction force system, as will be described in greater detail hereinafter.

In accordance with another aspect of the invention, the magnet is U-shaped and each leg of the U forms one pole piece of the magnet, i.e., a north pole and a south pole, so called. A magnet is disposed in each slot such that the pole pieces of the magnet lie substantially parallel to the axis of rotation of the driving wheel and perpendicular to the direction traversed by the conveyor belt. This is advantageous because the magnets thus hold the conveyor belt to the wheel with equal force over the entire width of the belt, rather than having a strong force only along the center portion of the belt as would be the case where the poles are parallel to the direction traversed by the conveyor belt.

In accordance with another aspect of the present invention, in order to obtain maximum magnetic flux, the magnets are disposed in the slots such that the north pole of each magnet is adjacent and spaced from the north pole of the adjacent magnet and the south pole of each magnet is adjacent and spaced from the south pole of the adjacent magnet.

Other objects, features and advantages of the present invention will become more apparent in light of the following detailed description of a preferred embodiment thereof and the drawings which accompany and illustrate the description.

DESCRIPTION OF THE DRAWINGS

FIG. 1 is a schematic illustration of an exemplary embodiment of a conveyor for conveying articles in accordance with the present invention.

FIG. 2 is a partial sectioned elevation view of a conveyor belt driving wheel in accordance with the invention.

FIG. 6 is a schematic illustration of another embodiment of a conveyor for conveying articles according to the present invention.

DESCRIPTION OF THE PREFERRED EMBODIMENT

Figure 3:
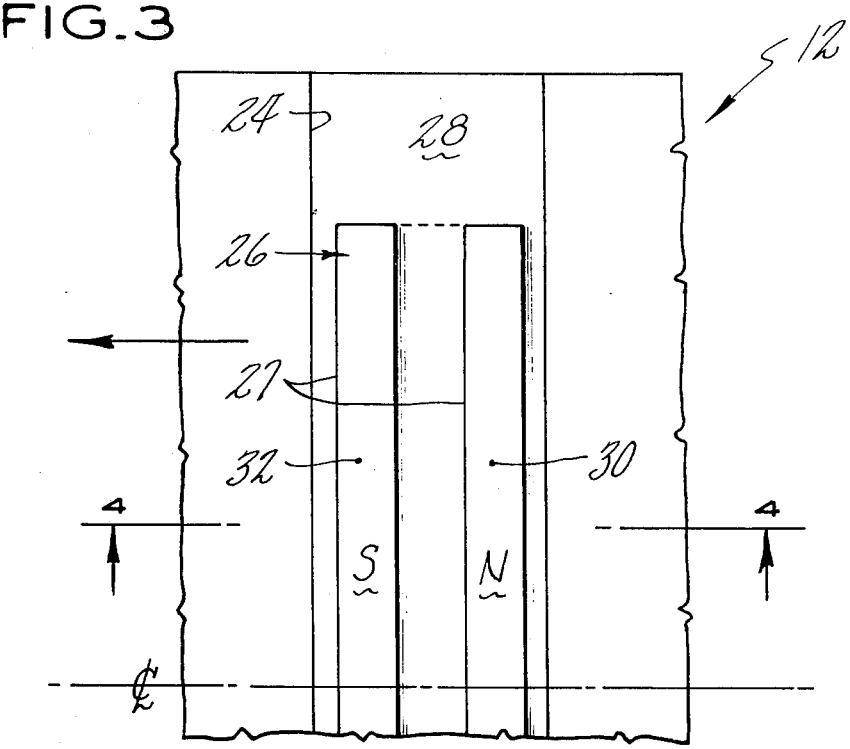
FIG. 3 is a partial plan view of the conveyor belt driving wheel of FIG. 2.

Referring to FIG. 1, there is shown one embodiment of a conveyor for conveying articles. The endless, magnetically attractable wire mesh belt 2 passes over portions of a first idler wheel or pulley 4, a second idler wheel or pulley 6, a first wrap wheel or pulley 8, a second wrap wheel or pulley 10, and a conveyor belt driving wheel 12, which may take the form of an electric motor 14 driving a speed reducing transmission 16, which in turn drives the driving wheel 12 through chain 18 which passes around sprockets 20 and 22. FIG. 2 shows the conveyor belt driving wheel 12 in greater detail. Slots 24 are provided in the periphery of the wheel 12. Permanent magnets 26 are disposed in the slots 24. The magnets 26 are advantageously bonded in the slots 24 to the wheel 12 with, for example, an aluminum/epoxy material, such as Devcon, manufactured by the Devcon Corporation of Danvers, Massachusetts. Many other types of bonding agents could be used. The bonding medium 28 must, of course, bond the magnets 26 in place. However, since the wheel 12 will most likely be cast iron, the material 28 utilized to bond the magnets in place must also be a magnetic insulator; i.e., the bonding material 28 must isolate, magnetically, the magnets 26 from the wheel 12.

Further, it will be noted (See FIG. 4 especially) that in accordance with one feature of the invention, the magnet 26 protrudes slightly radially outwardly of the periphery of the driving wheel 12. By placing the magnets 26 in this manner, the edges 27 of the magnets 26 become driving cleats which bite into the metallic belt and thus increase the force with which the driving wheel 12 drives the belt 2. This feature is very important to obtaining an improved magnetic drive. A test was performed which dramatically shows the increase in belt driving force when the magnets protrude slightly radially outwardly as compared with the case where the magnets are flush with the periphery of the driving wheel. A magnetic driving wheel having 24 magnets equally spaced around its outer periphery, each magnet having a shear force of 11 pounds, was constructed with the magnets flush with the periphery of the driving wheel.

A woven wire mesh belt was wrapped around the wheel 270°. The belt would support 215 pounds, at which point the belt slipped. A wheel of the same diameter was constructed with the same number of magnets (24), each having the same shear force (11 pounds). However, the magnets were disposed such that the centerline of the planar surface of the magnet poles was portioned tangentially to the wheel periphery, thus exposing the magnet edges 27 beyond the wheel diameter. A woven wire mesh belt was wrapped around the wheel to the same degree (270°), and the belt was able to support 550 pounds before slipping.

Figure 4:
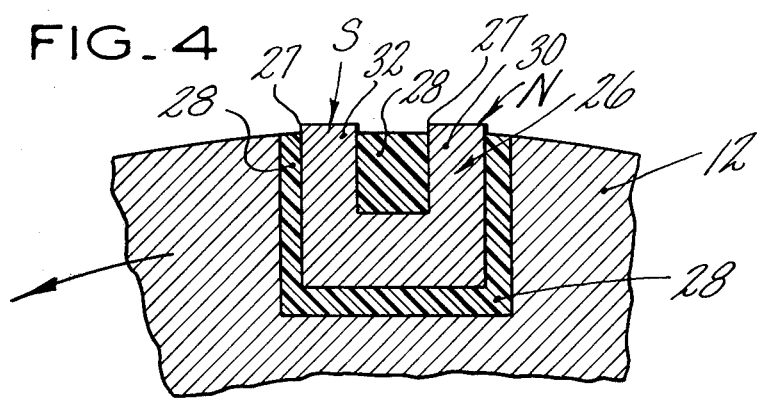
FIG. 4 is a partial section view taken along line 4—4 of FIG. 3.

Further it will be seen in FIG. 3 and FIG. 4 that the magnet 26 may be U-shaped. Each leg 30 and 32 forms a magnetic pole piece — one north pole and one south pole, so called. For purposes of illustration leg 30 will be designated the north pole of the magnet and leg 32 the south pole. As seen best in FIG. 4, the poles 30 and 32 of the magnet lie substantially parallel to the axis of rotation of the wheel 12 and perpendicular to the direction traversed by the belt 2. By this arrangement of the magnets 26 the belt 2 is held with an equal force across the entire width of the belt. A further refinement to the invention is to orient the magnets such that the north pole of each magnet is adjacent and spaced from the north pole of the adjacent magnet, and the south pole of each magnet is adjacent and spaced from the south pole of the other adjacent magnet as shown in FIG. 2.

Figure 5:
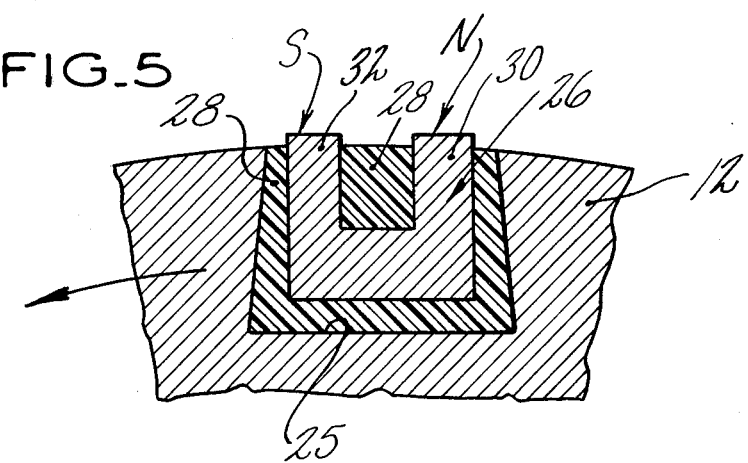
FIG. 5 is a partial section view similar to FIG. 4, but showing a slot of slightly different shape.

As a further feature of the invention, shown in FIG. 5, the slot 25 may be narrower at its open end then it is at its closed base end, thus making a plug out of the bonding material 28 surrounding the outside of the magnet 26, and holding the magnet firmly in place.

It is preferred to also fill the center section of the U-shaped magnet 26 with bonding material 28 to keep contaminants out of the magnet. It will also be noted that the bonding material does not fill the slot or space between the legs of the magnet completely to the radially outward portion of the magnet; this is to ensure the belt 2 being able to touch the magnet 26 all along the poles so that good magnetic contact is maintained.

FIG. 6 shows another embodiment of a conveyor in accordance with the present invention in which the driving wheel 12 drives a conveyor belt 2 over a single idler wheel 5. A motor 14 likewise drives the conveyor belt driving wheel 12 through a transmission 16 and a chain 18 as described with reference to FIG. 1.

There has thus been described a preferred embodiment of a conveyor and a conveyor belt driving wheel in accordance with the present invention. It should be understood by those skilled in the art that various changes and omissions in the form and detail thereof may be made therein without departing from the spirit and scope of the invention, which is to be limited only as set forth in the claims which follow.

What we claim as new and desire to secure by Letters Patent of the United States is:

1. A magnetic drive wheel for an endless woven magnetically attractable conveyor belt, comprising:
   a wheel having slots disposed in the outer periphery of said wheel;
   a permanent magnet disposed in each of said slots such that the outer surface of each of said magnets protrude radially outwardly of said wheel so that the magnets form driving cleats which engage said woven belt; and means for securing said magnets in said slots to said wheel, said means also magnetically isolating said magnets from said wheel.

2. A magnetic drive wheel as defined in claim 1, wherein each of said permanent magnets is U-shaped, each leg of the U forming a magnetic pole and each of said magnets being disposed such that said poles lie substantially parallel to the axis of rotation of said wheel.

3. A magnetic drive wheel as defined in claim 1, wherein each of said slots has an open end and a closed base end, said open end being disposed radially outwardly of said closed end, said open end being narrower in width than said closed base end.

4. A magnetic drive wheel as defined in claim 2, wherein each of said permanent magnets is oriented such that the north pole of each magnet is adjacent and spaced from the north pole of the adjacent magnet and the south pole of each magnet is adjacent and spaced from the south pole of the adjacent magnet.

5. A conveyor for conveying articles comprising:
an idler wheel;
a conveyor belt driving wheel spaced from said idler wheel, said driving wheel having slots disposed in the outer periphery thereof, and permanent magnets secured in said slots with securing means such that the outer surfaces of said magnets protrude radially outwardly of said driving wheel so that the magnets form driving cleats, said securing means both retaining said magnets in said slots in said driving wheel and also magnetically isolating said magnets from said driving wheel;
an endless woven magnetically attractable conveyor belt wrapped about portions of said idler wheel, said belt also being wrapped at least 180° around said driving wheel; and
means for driving said conveyor belt driving wheel.

6. A conveyor as defined in claim 5, wherein each of said magnets is U-shaped, each leg of the U forming a magnetic pole, and said magnets being disposed in said slots such that said poles lie substantially parallel to the axis of rotation of said wheel.

7. A conveyor as defined in claim 5, wherein each of said slots has an open end and a closed base end, said open end being disposed radially outwardly of said closed base end, said open end being narrower in width than said closed base end.

8. A conveyor as defined in claim 6, wherein each of said permanent magnets is oriented such that the north pole of each magnet is adjacent and spaced from the north pole of the adjacent magnet and the south pole of each magnet is adjacent and spaced from the south pole of the adjacent magnet.

9. A conveyor for conveying articles, comprising:
a first idler wheel;
a second idler wheel spaced from said first idler wheel;
a conveyor belt driving wheel spaced from said first and second idler wheels, said driving wheel having permanent magnets disposed in the outer periphery thereof, said magnets protruding radially outwardly of said driving wheel so as to form driving cleats, said magnets being disposed such that the poles of said magnets lie substantially parallel to the axis of rotation of said driving wheel, and said magnets being secured in said driving wheel by securing means which also magnetically isolate said magnets from said driving wheel;
a first wrap wheel disposed between and spaced from said first idler wheel and said conveyor belt driving wheel;
a second wrap wheel disposed between and spaced from said second idler wheel and said conveyor belt driving wheel;
an endless woven, magnetically attractable conveyor belt wrapped about portions of said first idler wheel, said second idler wheel, said first wrap wheel and said second wrap wheel, said belt also being wrapped at least 270° around said conveyor belt driving wheel; and
means for driving said conveyor belt driving wheel.

10. A conveyor as defined in claim 9, wherein each of said magnets is U-shaped, each leg of the U forming a magnetic pole, each of said magnets being oriented such that the north pole of each magnet is adjacent and spaced from the north pole of the adjacent magnet and the south pole of each magnet is adjacent and spaced from the south pole of the adjacent magnet.

* * * * *